United States Patent
Katori et al.

(10) Patent No.: US 9,836,237 B2
(45) Date of Patent: Dec. 5, 2017

(54) STORING DATA IN STORAGE AREA

(71) Applicant: International Business Machines Corporation, Armonk, NY (US)

(72) Inventors: Katsuyoshi Katori, Kawasaki (JP); Yutaka Oishi, Kawasaki (JP); Eiji Tosaka, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 14/935,606

(22) Filed: Nov. 9, 2015

(65) Prior Publication Data

US 2017/0131931 A1    May 11, 2017

(51) Int. Cl.
*G06F 12/00* (2006.01)
*G06F 3/06* (2006.01)

(52) U.S. Cl.
CPC .......... *G06F 3/0629* (2013.01); *G06F 3/0604* (2013.01); *G06F 3/0656* (2013.01); *G06F 3/0673* (2013.01)

(58) Field of Classification Search
CPC .... G06F 3/0629; G06F 3/0604; G06F 3/0673; G06F 3/0656
See application file for complete search history.

(56) References Cited

U.S. PATENT DOCUMENTS

| 6,021,408 A |   | 2/2000 | Ledain et al. |
| 6,094,695 A | * | 7/2000 | Kornher ................. G06F 5/065 710/56 |
| 6,347,335 B1 |  | 2/2002 | Shagam et al. |
| 8,028,010 B2 |  | 9/2011 | Grubbs et al. |

FOREIGN PATENT DOCUMENTS

EP        0810525 A1    12/1997

* cited by examiner

*Primary Examiner* — Shawn X Gu
(74) *Attorney, Agent, or Firm* — Samuel A. Waldbaum

(57) ABSTRACT

A computer-implemented method for storing data in a storage area, includes: storing a first data unit in a first area of the storage area, in response to a request to store a first data unit having a first attribute in the storage area, when at least one data unit having the first attribute is stored in the first area; and generating, a second area by reducing the first area, when no data unit having the second attribute is stored in the storage area in response to a request to store a second data unit having a second attribute in the storage area; furthermore, storing the second data unit in the second area.

18 Claims, 9 Drawing Sheets

306

```
struct {
    struct {
        int logical_device_id;
        int logical_path_id;
        int num_of_entry;
        int max_entry;
        int ...
    } meta_data;
    struct {
        int id;
        long timestamp;
        int data[5];
    } entry[S];
} log[D][P];
```

| ENTRY ID | FORMAT ID | TIME STAMP | DATA |
|---|---|---|---|
| 1 | f1 | 2015/02/22 01:01:00 | foo |
| 2 | f2 | 2015/02/22 01:02:00 | bar |
| 3 | f3 | 2015/02/22 01:03:00 | baz |
| 4 | f4 | 2015/02/22 01:00:00 | bez |

702

STORING DATA IN STORAGE AREA

BACKGROUND

The present disclosure relates generally to the field of computer systems, and more particularly to storing data in a storage area.

Computer data storage, often called storage or memory, is a technology consisting of computer components and recording media used to retain digital data. It is a core function and fundamental component of computers. The central processing unit (CPU) of a computer is what manipulates data by performing computations. In practice, generally most computers use a storage hierarchy.

SUMMARY

According to an embodiment of the present invention, there is provided a computer-implemented method for storing data in a storage area. The method includes storing, in response to a request to store a first data unit having a first attribute in the storage area, the first data unit in a first area of the storage area, if at least one data unit having the first attribute is stored in the first area. The method further includes generating, in response to a request to store a second data unit having a second attribute in the storage area, a second area by reducing the first area, if no data unit having the second attribute is stored in the storage area. The method furthermore includes storing the second data unit in the second area.

According to another embodiment of the present invention, there is provided an apparatus for storing data in a storage area. The apparatus includes a processor and a memory coupled to the processor. The memory includes program instructions. The program instructions are executable by the processor to cause the processor to store, in response to a request to store a first data unit having a first attribute in the storage area, the first data unit in a first area of the storage area, if at least one data unit having the first attribute is stored in the first area. The program instructions are executable by the processor to further cause the processor to generate, in response to a request to store a second data unit having a second attribute in the storage area, a second area by reducing the first area, if no data unit having the second attribute is stored in the storage area. The program instructions are executable by the processor to furthermore cause the processor to store the second data unit in the second area.

According to yet another embodiment of the present invention, there is provided a computer program product for storing data in a storage area. The computer program product includes a computer readable storage medium having program instructions embodied with the computer readable storage medium. The program instructions are executable by a computer to cause the computer to store, in response to a request to store a first data unit having a first attribute in the storage area, the first data unit in a first area of the storage area, if at least one data unit having the first attribute is stored in the first area. The program instructions are executable by a computer to further cause the computer to generate, in response to a request to store a second data unit having a second attribute in the storage area, a second area by reducing the first area, if no data unit having the second attribute is stored in the storage area. The program instructions are executable by a computer to furthermore cause the computer to store the second data unit in the second area.

BRIEF DESCRIPTION OF THE DRAWINGS

FIG. 3 depicts an example of a structure of a log object.

FIG. 7 depicts an example of log entries for explaining move of some log entries.

DETAILED DESCRIPTION

Hereinafter, exemplary embodiments of the present invention will be described in detail with reference to the attached drawings.

It is to be noted that the present invention is not limited to these exemplary embodiments to be given below and may be implemented with various modifications within the scope of the present invention. In addition, the drawings used herein are for purposes of illustration, and may not show actual dimensions.

Figure 1:
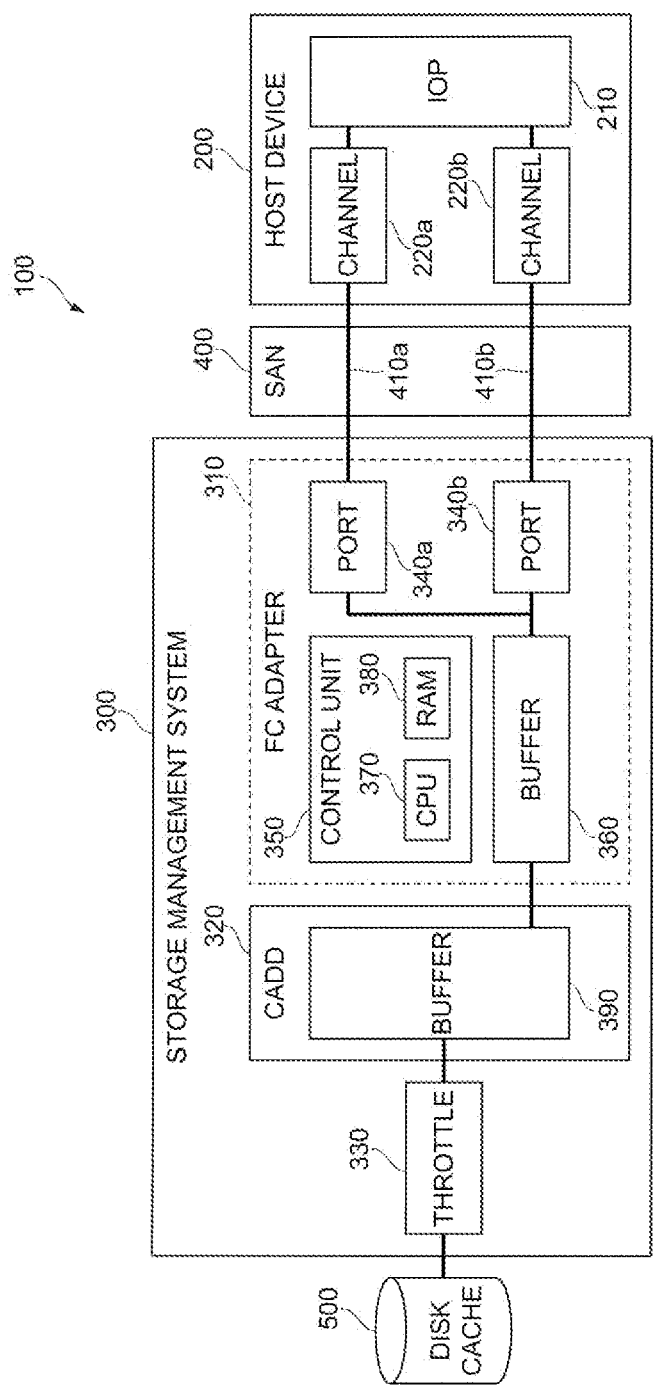
FIG. 1 depicts a block diagram of a computer system according to exemplary embodiments of the present invention.

Referring to FIG. 1, there is shown a block diagram of a computer system 100 to which the exemplary embodiments are applied. As shown in the figure, the computer system 100 may include a host device 200 and a storage management system 300 connected to each other via a storage area network (SAN) 400, and a disk cache 500 connected to the storage management system 300.

The host device 200 may include an input/output processor (IOP) 210, and channels 220a and 220b. The IOP 210 may transmit data from outside to either one of the channels 220a and 220b. Each of the channels 220a and 220b may communicate with the storage management system 300. Specifically, a channel 220a may transmit the data from the IOP 210 to the storage management system 300 via a wire connection 410a in the SAN 400, and a channel 220b may transmit the data from the IOP 210 to the storage management system 300 via a wire connection 410b in the SAN 400. Note that, the host device 200 may operate z/OS™ (owned by International Business Machines Corporation).

The storage management system 300 may include a fiber channel (FC) adapter 310, a channel adapter device driver (CADD) 320, and a throttle 330.

The FC adapter 310 may further include ports 340a and 340b, a control unit 350, and a buffer 360. The ports 340a and 340b may be connected to the wire connection 410a and wire connection 410b, respectively. Thus, the port 340a may receive the data from the channel 220a via the wire connection 410a, and the port 340b may receive the data from the channel 220b via the wire connection 410b. The control unit 350 may communicate with the channels 220a and 220b. Specifically, the control unit 350 may receive the data from the channel 220a via the port 340a, or the data from the channel 220b via the port 340b. Furthermore, the control unit 350 may include a central processing unit (CPU) 370 serving as one example of a processor, and a random access memory (RAM) 380 coupled to the CPU 370 serving as one example of a memory. The buffer 360 may temporarily store the data which the control unit 350 has received from the channel 220a or the channel 220b. The buffer 360 may be a sequence buffer memory (SBM). Note that, the FC adapter 310 may be implemented in a FICON® adapter using the ANSI Single-Byte Command Code Sets-3 Mapping Protocol (FC-SB-3) operating in FC layer 4.

The CADD 320 may receive the data from the FC adapter 310. The CADD 320 may further include a buffer 390. The buffer 390 may temporarily store the data from the FC adapter 310. The CADD 320 may transmit the data within the buffer 390 to the disk cache 500.

The throttle 330 may manage a transfer from the CADD 320 to the disk cache 500, to avoid a situation where the disk cache 500 does not have free space when requested to read the data from a storage device such as a tape drive (not shown in the figure).

In the exemplary embodiments, the storage management system 300 may be implemented in IBM® (owned by International Business Machines Corporation) Virtualization Engine TS7700 which uses the FICON® (Fiber Channel Connection) protocol (FICON® is owned by International Business Machines Corporation) for communication.

Using this engine, the storage management system 300 can provide, to the host device 200, one physical device (e.g., the disk cache 500) as plural logical devices, and one physical path (e.g., the wire connection 410a or the wire connection 410b) as plural logical paths. This enables the plural logical paths to be used for each of the plural logical devices. Thus, to analyze problems which have occurred in a logical path, event logs (hereinafter referred to as "logs") stored for the logical path are useful.

Figure 2:
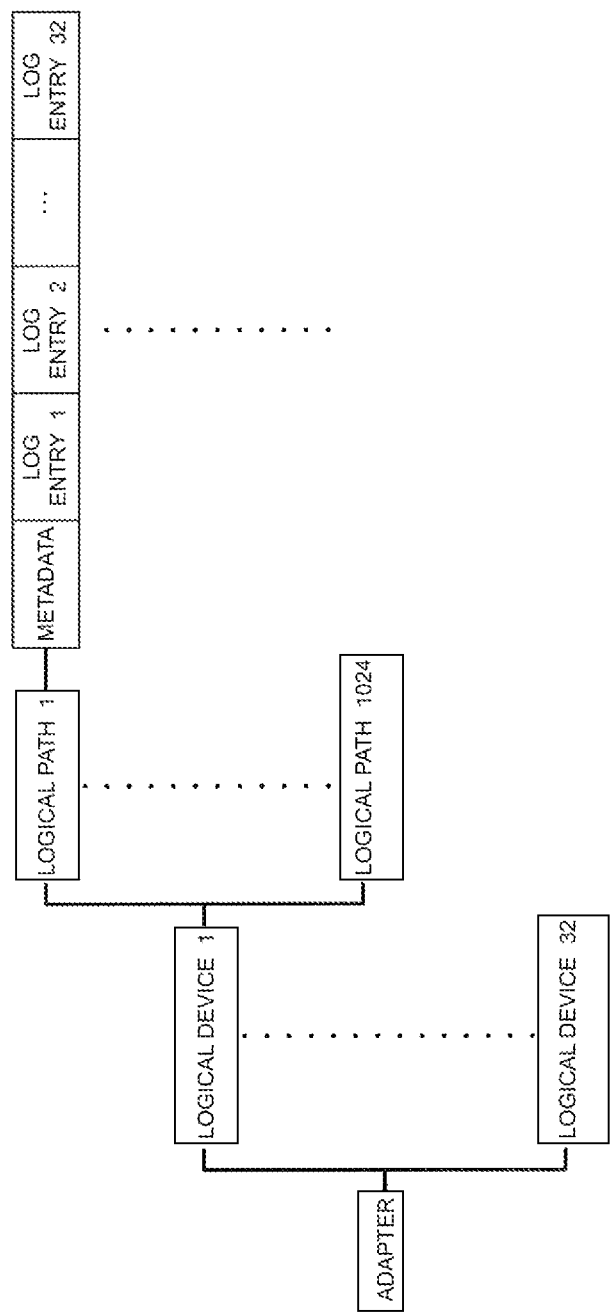
FIG. 2 depicts an example of a typical configuration of logs for logical paths.

Referring to FIG. 2, there is shown an example of a typical configuration of logs for the logical paths. As shown in the figure, 32 logical devices may be provided per adapter (FC adapter 310), and 1024 logical paths may be provided per logical device. Further, as shown in the figure, metadata and 32 log entries may be provided per logical path. The metadata may be 32 bytes of data including information identifying a corresponding logical device and a corresponding logical path, the number of log entries which are currently used for the corresponding logical path, and the number of log entries which are allocated for the corresponding logical path, and the like. Each of the 32 log entries may be 32 bytes of data including 4 bytes of a format ID, 8 bytes of a time stamp, and five data blocks. The format ID may identify a format of the five data blocks. The format of the five data blocks may vary depending on the kind of an event for which a log has been stored. Thus, the format ID may identify the kind of the event as well. The time stamp may indicate the time when the event has occurred. Each of the five data blocks may be 4 bytes of data indicating the detail of the event. As described above, in the typical configuration, the total amount of the logs per adapter may be approximately 33 MB (=(32 bytes+32 bytes×32)×1024× 32).

However, the number of logical paths which are actually used among the 32768 (=1024×32) logical paths allocated for an adapter in the abovementioned typical configuration depends on the usage condition of the computer system 100. Although all logical paths are used in some cases, only less than 10% of the logical paths are used in many cases depending on the usage condition.

In view of this, the exemplary embodiments increase the number of log entries for some logical paths without increasing the total number of log entries, particularly in an environment in which the number of the logical paths to be used is small. Specifically, the exemplary embodiments allow the number of log entries for each logical path to be reduced depending on the usage condition.

In the exemplary embodiments, values are represented as follows:
(1) the amount of data per log entry: E;
(2) the minimum number of log entries per logical path: S;
(3) the maximum number of log entries per logical path: L (where there is a natural number N satisfying L=S×2^N);
(4) the current number of log entries per logical path: C (where there is a natural number K satisfying C=S×2^K and 0≤K≤N);
(5) the amount of metadata per logical path: M;
(6) the number of logical paths per logical device: P;
(7) the number of logical devices per adapter: D;
(8) the total amount of data of logs: T=(M+E×S)×P×D.

Referring to FIG. 3, an example of a structure 306 is illustrated. Structure 306 is a structure of a log object which is used in the exemplary embodiments. As shown in the figure, this structure may include D×P "log" structures, and each of the "log" structures may include one "meta_data" structure and S "entry" structures. If C is greater than S, plural consecutive log objects may be allocated for one logical path. In this case, a "meta_data" structure belonging to the leading log object among the plural consecutive log objects may be used for the plural consecutive log objects.

As shown in FIG. 3, the "meta_data" structure may include a "logical_device_id" member, a "logical_path_id" member, a "num_of_entry" member, a "max_entry" member, and the like. The "logical_device_id" member may identify the corresponding logical device, and the "logical_path_id" member may identify the corresponding logical path. The "num_of_entry" member may indicate the number of log entries which are currently used for the corresponding logical path, and the "max_entry" member may indicate the number of log entries which are allocated for the corresponding logical path (i.e., C).

Further, the "entry" structure may include an "id" member, a "timestamp" member, and five "data" members. The "id" member may indicate the format ID stated above. The "timestamp" member may indicate the time stamp stated above. The five "data" members may indicate the five data blocks stated above.

It is assumed that, as a general way, the FC adapter 310 divides in advance a log area for storing the total amount of data T of logs in the RAM 380 into D×P areas, and stores the logs for each logical path in a corresponding area of the D×P areas. On the other hand, in the exemplary embodiments, the FC adapter 310 divides the log area into one or more first areas. Then, every time a log regarding a logical path is requested to be stored, the FC adapter 310 allocates an unused area for the logical path. If the unused area does not exist in the log area, the FC adapter 310 generates at least one second area which is unused, by reducing at least one of the one or more first areas.

Figure 4:
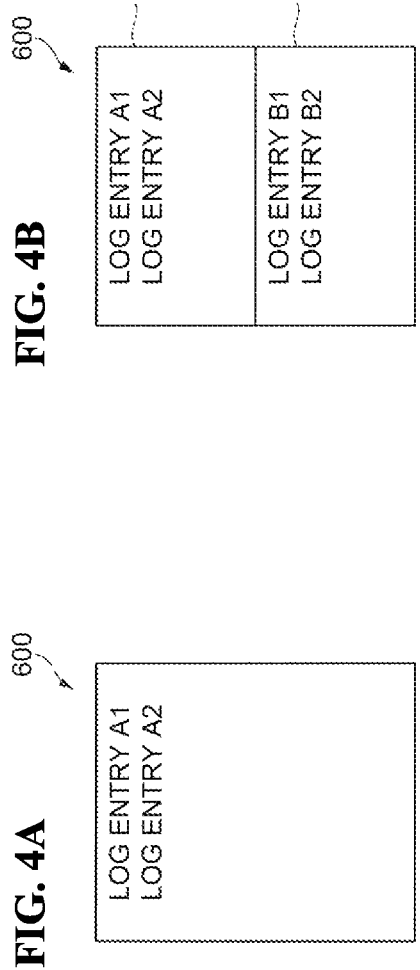
FIGS. 4A to 4C depict an example of division of the log area into areas for corresponding logical paths in the preferred embodiment.

Referring to FIGS. 4A to 4C, there are shown diagrams illustrating an example of division of the log area into areas for corresponding logical paths in the preferred embodiment. In the preferred embodiment, the FC adapter 310 may divide the first area for the first logical path into two halves, and define either one of the two halves as the second area for the second logical path.

At first, the log area 600 as one example of the storage area has not yet been divided, as shown in FIG. 4A. Then, assume that the FC adapter 310 receives a request to store a log entry A1 regarding a logical path A. At this time, the log area is not used yet. Thus, the FC adapter 310 may store the log entry A1 in the log area 600, as shown in FIG. 4A. Further, assume that the FC adapter 310 receives a request to store a log entry A2 as one example of the first log entry regarding the logical path A as one example of the first logical path. At this time, the log entry A1 regarding the logical path A is stored in the log area 600. Thus, the FC adapter 310 may store the log entry A2 in the log area 600 as one example of the first area, as shown in FIG. 4A.

Next, assume that the FC adapter 310 receives a request to store a log entry B1 as one example of the second log entry regarding a logical path B as one example of the second logical path. At this time, the log area 600 includes neither an area in which at least one log entry regarding the logical path B is stored, nor at least one unused area. Thus, the FC adapter 310 may divide the log area 600 into an area 611 and an area 612, and may store the log entry B1 in the area 612 as one example of the second area, as shown in FIG. 4B. Further, assume that the FC adapter 310 receives a request to store a log entry B2 regarding the logical path B. At this time, the log entry B1 regarding the logical path B is stored in the area 612. Thus, the FC adapter 310 may store the log entry B2 in the area 612, as shown in FIG. 4B.

Furthermore, assume that the FC adapter 310 receives a request to store a log entry C1 regarding a logical path C. At this time, the log area 600 includes neither an area in which at least one log entry regarding the logical path C is stored, nor at least one unused area. Thus, the FC adapter 310 may divide the area 611 into an area 621 and an area 622, and the area 612 into an area 623 and an area 624, and may store the log entry C1 in the area 622, as shown in FIG. 4C. Further, assume that the FC adapter 310 receives a request to store a log entry D1 regarding a logical path D. At this time, the area 624 is unused, although the log area 600 includes no area in which at least one log entry regarding the logical path D is stored. Thus, the FC adapter 310 may store the log entry D1 in the area 624, as shown in FIG. 4C.

Figure 5:
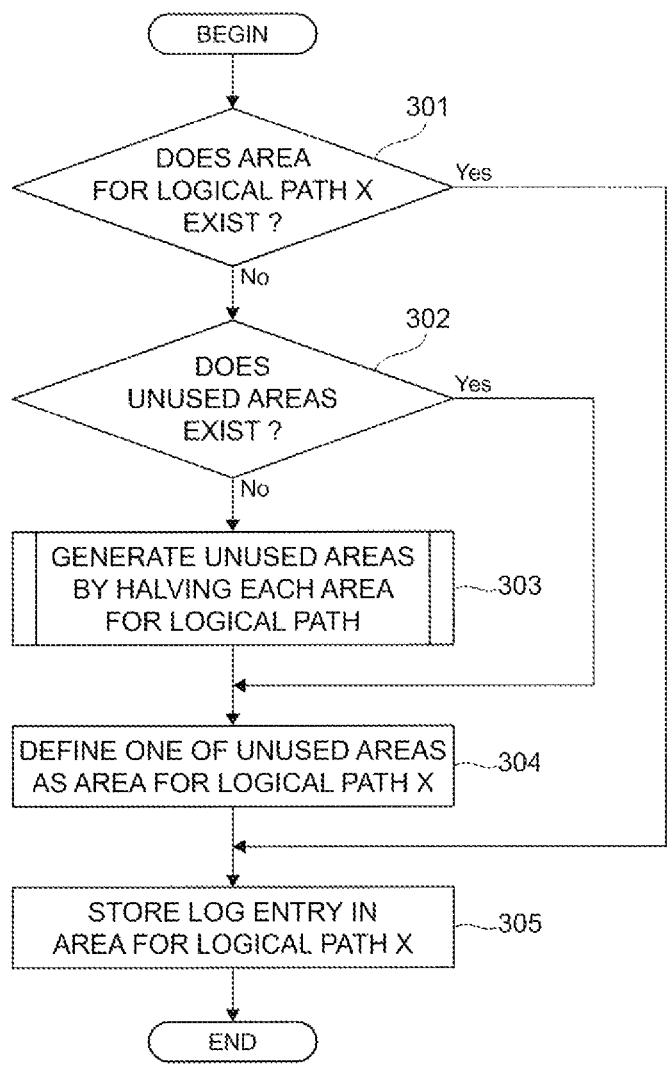
FIG. 5 depicts a flowchart representing an example of an operation performed when a FC adapter stores a log entry in the log area.

Referring to FIG. 5, there is shown a flowchart representing an example of an operation performed when the FC adapter 310 stores a log entry in the log area. Note that, although FIGS. 4A to 4C indicate an operation when the FC adapter 310 stores the log entries regarding the logical paths A, B, C and D, the flowchart indicates an operation when the FC adapter 310 stores a log entry regarding a logical path X. When receiving a request to store the log entry in the log area, the FC adapter 310 begins the operation.

As shown in the figure, the FC adapter 310 may first determine whether or not an area for the logical path X exists in the log area (step 301). If the area for the logical path X exists in the log area, the FC adapter 310 may store the log entry in the area for the logical path X (step 305).

If, at step 301, no area for the logical path X exists in the log area, the FC adapter 310 may further determine whether or not one or more unused areas exists in the log area (step 302). If one or more unused areas exist in the log area, the FC adapter 310 may define one of the one or more unused areas as an area for the logical path X (step 304). After that, the FC adapter 310 may store the log entry in the area for the logical path X (step 305).

If, at step 302, no unused area exists in the log area, the FC adapter 310 may generate one or more unused areas by halving each area for a corresponding logical path (step 303). The processing at this step is explained in detail later. Then, the FC adapter 310 may define one of the one or more unused areas as an area for the logical path X (step 304). After that, the FC adapter 310 may store the log entry in the area for the logical path X (step 305).

Figure 6:
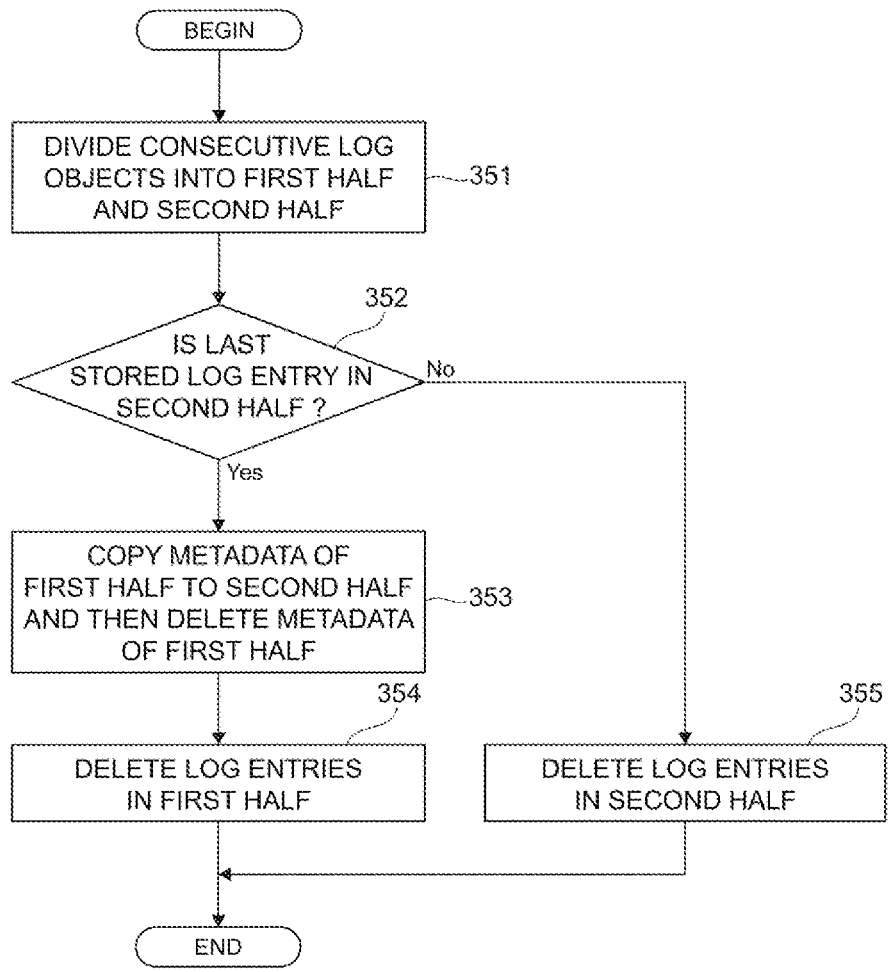
FIG. 6 depicts a flowchart representing an example of an operation performed when a FC adapter halves each area for a corresponding logical path.

Referring to FIG. 6, there is shown a flowchart representing an example of an operation performed when the FC adapter 310 halves each area for a corresponding logical path at step 303 of FIG. 5. Note that, although the FC adapter 310 is assumed to halve each area in FIG. 5, the FC adapter 310 is assumed to halve one area for one logical path in FIG. 6. Further, the FC adapter 310 is assumed to store log entries more than S as plural consecutive log objects in the area for the logical path X.

The FC adapter 310 may first divide the plural consecutive log objects into a first half and a second half (step 351). Specifically, the FC adapter 310 may reduce a value of "meta_data.max_entry" to half. Next, the FC adapter 310 may determine whether or not the last stored log entry is in the second half (step 352).

If the last stored log entry is in the second half, the FC adapter 310 may copy the metadata of the first half to the second half, and then delete the metadata of the first half (step 353). Subsequently, the FC adapter 310 may delete all log entries in the first half (step 354). By performing this step, the first half may become an unused area.

If, at step 352, the last stored log entry is not in the second half, i.e., if the last stored log entry is in the first half, the FC adapter 310 may delete all log entries in the second half (step 355). By performing this step, the second half may become an unused area.

Note that, although omitted from the flowchart to simplify the description, the FC adapter 310 may move some log entries at step 354 or 355. Specifically, at step 354, if a log entry in the first half is newer than any one of the log entries in the second half, the FC adapter 310 may move the log entry in the first half to the second half before the deletion of the log entries in the first half. Alternatively, at step 355, if a log entry in the second half is newer than any one of the log entries in the first half, the FC adapter 310 may move the log entry in the second half to the first half before the deletion of the log entries in the second half.

Referring to FIG. 7, there is shown an example of log entries for explaining the move of some log entries. As shown in the chart 702, each of the log entries includes a format ID, a time stamp, and data stated above. Note that, in FIG. 7, an entry ID indicating a value of S in the structure of FIG. 3 is also shown for each of the log entries, although not stored as data.

For example, assume that the FC adapter 310 divides the four consecutive log entries of FIG. 7 into the first half (the log entries #1 and #2) and the second half (log entries #3 and #4). In FIG. 7, the log entry #3 which is lastly stored is included in the second half. However, the log entry #4 in the second half has been stored before the log entries #1 and #2 in the first half are stored. The reason why an old log entry such as the log entry #4 is included in the second half is that each area for a logical path is used as a ring buffer. In this case, the FC adapter 310 may overwrite the log entry #4 which is old information in the second half with the log entry #2 which is relatively new information in the first half.

Note that, although values of L and T are limited to the values defined by the aforementioned equations to simplify the explanation in the above description, L and T may be set to any values, respectively.

Furthermore, although each area for a corresponding logical path is divided into halves in the above description, each area for the corresponding logical path may be divided in various manners.

Referring to FIGS. 8A to 8D, there are shown diagrams illustrating an example of division of the log area into areas for corresponding logical paths in the first alternative embodiment. In the first alternative embodiment, when the first area for the first logical path is one of N equal parts of the log area, the FC adapter 310 may divide the log area into M equal parts, and define any one of the M equal parts as the second area for the second logical path (M and N are natural numbers and M is greater than N). For example, the log area may be first divided into halves, secondly divided into three equal parts, and thirdly divided into quarters.

Figure 8B:
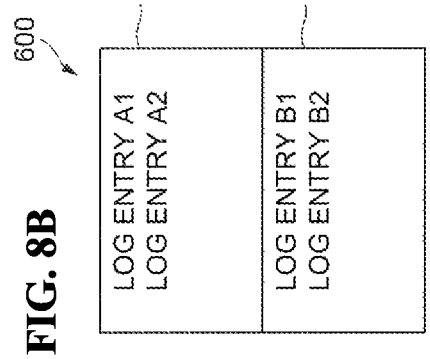
FIGS. 8A to 8D depict an example of division of the log area into areas for corresponding logical paths in the first alternative embodiment.
Figure 8D:
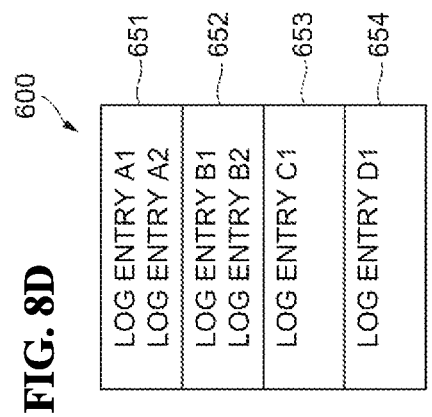
Figure 8A:
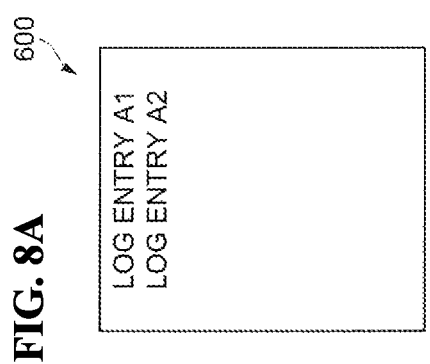

At first, the log area 600 as one example of the storage area has not yet been divided, as shown in FIG. 8A. Then, assume that the FC adapter 310 receives a request to store a log entry A1 regarding a logical path A. At this time, the log area is not used yet. Thus, the FC adapter 310 may store the log entry A1 in the log area 600, as shown in FIG. 8A. Further, assume that the FC adapter 310 receives a request to store a log entry A2 as one example of the first log entry regarding the logical path A as one example of the first logical path. At this time, the log entry A1 regarding the logical path A is stored in the log area 600. Thus, the FC adapter 310 may store the log entry A2 in the log area 600 as one example of the first area, as shown in FIG. 8A.

Next, assume that the FC adapter 310 receives a request to store a log entry B1 as one example of the second log entry regarding a logical path B as one example of the second logical path. At this time, the log area 600 includes neither an area in which at least one log entry regarding the logical path B is stored, nor at least one unused area. Thus, the FC adapter 310 may divide the log area 600 into an area 631 and an area 632, and may store the log entry B1 in the area 632 as one example of the second area, as shown in FIG. 8B. Further, assume that the FC adapter 310 receives a request to store a log entry B2 regarding the logical path B. At this time, the log entry B1 regarding the logical path B is stored in the area 632. Thus, the FC adapter 310 may store the log entry B2 in the area 632, as shown in FIG. 8B.

Figure 8C:
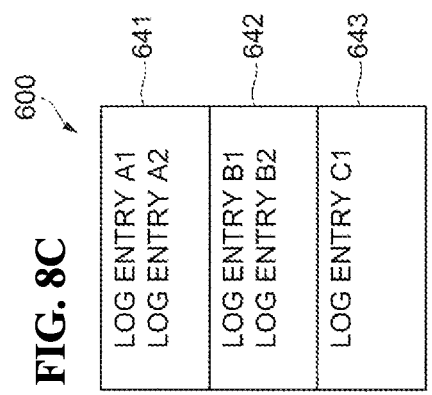

Subsequently, assume that the FC adapter 310 receives a request to store a log entry C1 regarding a logical path C. At this time, the log area 600 includes neither an area in which at least one log entry regarding the logical path C is stored, nor at least one unused area. Thus, the FC adapter 310 may divide the log area 600 into an area 641, an area 642 and an area 643, and may store the log entry C1 in the area 643, as shown in FIG. 8C. Further, assume that the FC adapter 310 receives a request to store a log entry D1 regarding a logical path D. At this time, the log area 600 includes neither an area in which at least one log entry regarding the logical path D is stored, nor at least one unused area. Thus, the FC adapter 310 may divide the log area 600 into an area 651, an area 652, an area 653, and an area 654, and may store the log entry D1 in the area 654, as shown in FIG. 8D.

Referring to FIGS. 9A to 9D, there are shown diagrams illustrating an example of division of the log area into areas for corresponding logical paths in the second alternative embodiment. In the second alternative embodiment, the FC adapter 310 may cut out a part of a predetermined size from the first area for the first logical path, and define the part as the second area for the second logical path. For example, small parts each being 5 MB may be cut out from the log area one by one, and when any small part of 5 MB cannot be cut out from the log area, smaller parts each being 1 MB may be cut out from each of the small parts.

Figure 9B:
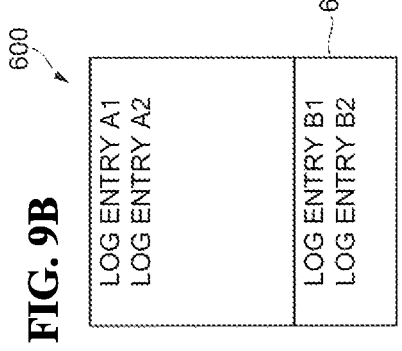
FIGS. 9A to 9D depict an example of division of the log area into areas for corresponding logical paths in the second alternative embodiment.
Figure 9D:
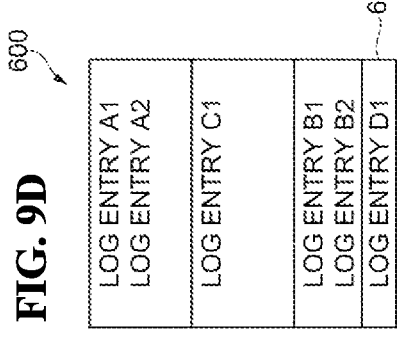
Figure 9A:
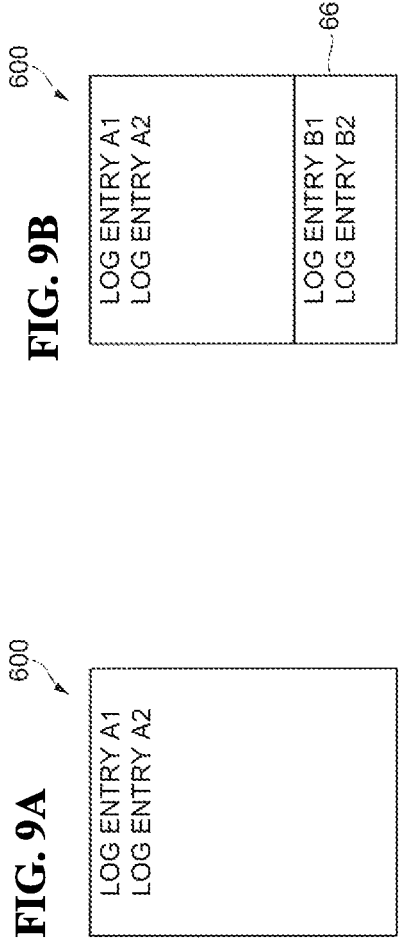

At first, the log area 600 as one example of the storage area has not yet been divided, as shown in FIG. 9A. Then, assume that the FC adapter 310 receives a request to store a log entry A1 regarding a logical path A. At this time, the log area is not used yet. Thus, the FC adapter 310 may store the log entry A1 in the log area 600, as shown in FIG. 9A. Further, assume that the FC adapter 310 receives a request to store a log entry A2 as one example of the first log entry regarding the logical path A as one example of the first logical path. At this time, the log entry A1 regarding the logical path A is stored in the log area 600. Thus, the FC adapter 310 may store the log entry A2 in the log area 600 as one example of the first area, as shown in FIG. 9A.

Next, assume that the FC adapter 310 receives a request to store a log entry B1 as one example of the second log entry regarding a logical path B as one example of the second logical path. At this time, the log area 600 includes neither an area in which at least one log entry regarding the logical path B is stored, nor at least one unused area. Thus, the FC adapter 310 may cut out the area 661 of the first predetermined size from a log area 600, and may store the log entry B1 in the area 661 as one example of the second area, as shown in FIG. 9B. Further, assume that the FC adapter 310 receives a request to store a log entry B2 regarding the logical path B. At this time, the log entry B1 regarding the logical path B is stored in the area 661. Thus, the FC adapter 310 may store the log entry B2 in the area 661, as shown in FIG. 9B.

Figure 9C:
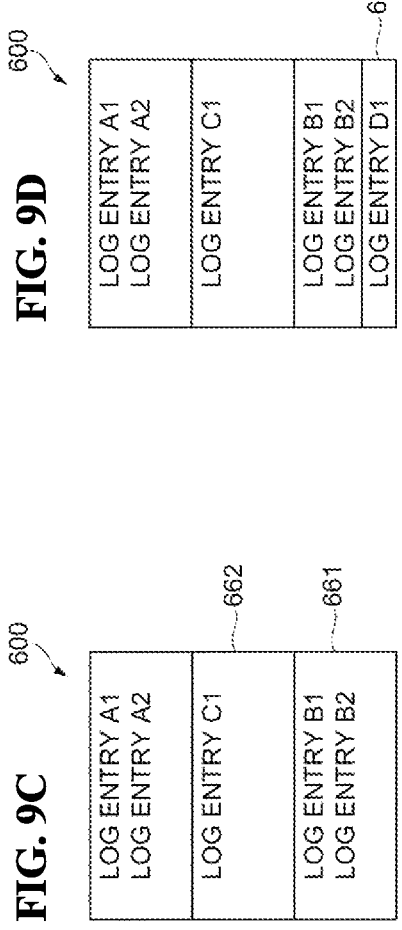

Subsequently, assume that the FC adapter 310 receives a request to store a log entry C1 regarding a logical path C. At this time, the log area 600 includes neither an area in which at least one log entry regarding the logical path C is stored, nor at least one unused area. Thus, the FC adapter 310 may cut out the area 662 of the first predetermined size from a log area 600, and may store the log entry C1 in the area 662, as shown in FIG. 9C. Further, assume that the FC adapter 310 receives a request to store a log entry D1 regarding a logical path D. At this time, the log area 600 includes neither an area in which at least one log entry regarding the logical path D is stored, nor at least one unused area, and no area of the first predetermined size can be cut out from the log area 600. Thus, the FC adapter 310 may cut out the area 671 of the second predetermined size from the area 661, and may store the log entry D1 in the area 671, as shown in FIG. 9D.

Note that, in the exemplary embodiments, the data stored in the storage area is assumed to be log entries each regarding a corresponding logical path, but is not limited thereto. The data may be data units each having a corresponding attribute.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for storing data in a storage area, the method comprising:
   receiving a request to store first log regarding a first logical path;
   determining whether a first unused area of storage exists to store the first log regarding the first logical path;

in response to the first unused area existing, storing the first log regarding the first logical path having a first attribute in the first unused area, wherein the first log having the first attribute is stored in the first unused area;

receiving a request to store a second log regarding a second logical path;

determining that a second unused area does not exist to store the second log regarding the second logical path;

in response to the second unused area not existing, generating a second unused area by reducing the first unused area, wherein the second log has a second attribute;

storing the second log regarding the second logical path in the second unused area;

providing a physical path as a plurality of logical paths, wherein the first log regarding the first logical path having the first attribute includes a first log entry regarding a first logical path of the plurality of logical paths, and wherein the second log regarding the second logical path having the second attribute includes a second log entry regarding a second logical path of the plurality of logical paths.

2. The method of claim 1, wherein the generating the second unused area includes generating the second unused area, when no unused area exists in the storage area.

3. The method of claim 1, further comprising storing the second log regarding the second logical path in an unused area, when no log regarding the second logical path having the second attribute is stored in the storage area, and the unused area exists in the storage area.

4. The method of claim 1, wherein the generating the second unused area includes dividing the first unused area into two halves, and defining either one of the two halves as the second unused area.

5. The method of claim 4, wherein the defining either one of the two halves includes defining one of the two halves as the second unused area, the other one of the two halves including a log regarding a logical path which is lastly stored in the first unused area.

6. The method of claim 5, wherein the generating the second unused area further includes overwriting an old log regarding the logical path in the one of the two halves with a new log regarding the logical path in the other of the two halves, the old log regarding the logical path being stored in the storage area before the new log regarding the logical path is stored in the storage area.

7. The method of claim 1, wherein the generating the second unused area includes dividing the storage area into M equal parts, and defining any one of the M equal parts as the second unused area, in a case where a first area is one of N equal parts of the storage area, where M and N are natural numbers and M is greater than N.

8. The method of claim 1, wherein the generating the second unused area includes cutting out a part of a predetermined size from the first unused area, and defining the part as the second unused area.

9. An apparatus for storing data in a storage area, the apparatus comprising:
a processor; and
a memory coupled to the processor, wherein
the memory comprises program instructions executable by the processor to cause the processor to:
receiving a request to store first log regarding a logical path;
determining whether a first unused area of storage exists to store the first log regarding the first logical path;

in response to the first unused area existing, storing the first log regarding the first logical path having a first attribute in the first unused area, wherein the first log having a first attribute is stored in the first unused area;

receiving a request to store a second log regarding a second logical path;

determining that a second unused area does not exist to store the second log regarding the second logical path;

in response to the second unused area not existing, generating a second unused area by reducing the first unused area, wherein the second log has a second attribute;

storing the second log regarding the second logical path in the second unused area;

providing a physical path as a plurality of logical paths, wherein the first log regarding the first logical path having the first attribute includes a first log entry regarding a first logical path of the plurality of logical paths, and wherein the second log regarding the second logical path having thesecond attribute includes a second log entry regarding a second logical path of the plurality of logical paths.

10. The apparatus of claim 9, wherein the generating the second unused area includes generating the second unused area, when no unused area exists in the storage area.

11. A computer program product for storing data in a storage area, the computer program product comprising a computer readable storage medium having program instructions embodied therewith, the program instructions executable by a computer to cause the computer to:
receiving a request to store first log regarding a first logical path;
determining whether a first unused area of storage exists to store the first log regarding the first logical path;
in response to the first unused area existing, storing the first log regarding the first logical path having a first attribute in the first unused area, wherein the first log having the first attribute is stored in the first unused area;
receiving a request to store a second log regarding a second logical path;
determining that a second unused area does not exist to store the second log regarding the second logical path;
in response to the second unused area not existing, generating a second unused area by reducing the first unused area, wherein the second log has a second attribute;
storing the second log regarding the second logical path in the second unused area;
providing a physical path as a plurality of logical paths, wherein the first log regarding the first logical path having the first attribute includes a first log entry regarding a first logical path of the plurality of logical paths, and wherein the second log regarding the second logical path having the second attribute includes a second log entry regarding a second logical path of the plurality of logical paths.

12. The computer program product of claim 11, wherein the generating the second unused area includes generating the second unused area, when no unused area exists in the storage area.

13. The computer program product of claim 11, further comprising storing the second log regarding the second logical path in an unused area, when no log regarding the second logical path having the second attribute is stored in the storage area, and the unused area exists in the storage area.

14. The computer program product of claim 11, wherein the generating the second unused area includes dividing the first unused area into two halves, and defining either one of the two halves as the second unused area.

15. The computer program product of claim 14, wherein the defining either one of the two halves includes defining one of the two halves as the second unused area, the other one of the two halves including a log regarding a logical path which is lastly stored in the first unused area.

16. The computer program product of claim 15, wherein the generating the second unused area further includes overwriting an old log regarding the logical path in the one of the two halves with a new log regarding the logical path in the other of the two halves, the old log regarding the logical path being stored in the storage area before the new log regarding the logical path is stored in the storage area.

17. The computer program product of claim 11, wherein the generating the second unused area includes dividing the storage area into M equal parts, and defining any one of the M equal parts as the second unused area, in a case where a first area is one of N equal parts of the storage area, where M and N are natural numbers and M is greater than N.

18. The computer program product of claim 11, wherein the generating the second unused area includes cutting out a part of a predetermined size from the first unused area, and defining the part as the second unused area.

\* \* \* \* \*